US010085161B1

(12) United States Patent
Oroskar et al.

(10) Patent No.: US 10,085,161 B1
(45) Date of Patent: Sep. 25, 2018

(54) DYNAMIC VARIATION OF RADIO LINK FAILURE TIMER DURATION FOR RELAY BACKHAUL LINK, WITH TIMER DURATION BEING SET BASED ON NUMBER OF SERVED UES

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 305 days.

(21) Appl. No.: 15/045,708

(22) Filed: Feb. 17, 2016

(51) Int. Cl.
*H04W 24/04* (2009.01)
*H04W 76/02* (2009.01)
*H04W 76/19* (2018.01)

(52) U.S. Cl.
CPC ......... *H04W 24/04* (2013.01); *H04W 76/028* (2013.01); *H04W 76/19* (2018.02)

(58) Field of Classification Search
None
See application file for complete search history.

(56) References Cited

U.S. PATENT DOCUMENTS

| 8,918,106 | B2 | 12/2014 | Morioka et al. | |
|---|---|---|---|---|
| 2011/0164587 | A1* | 7/2011 | Seo | H04L 1/1671 370/329 |
| 2011/0242970 | A1* | 10/2011 | Prakash | H04W 76/068 370/225 |
| 2012/0088498 | A1* | 4/2012 | Xiao | H04W 24/02 455/424 |
| 2013/0044675 | A1* | 2/2013 | Zhang | H04B 7/155 370/315 |
| 2013/0070664 | A1 | 3/2013 | Nagata | |

(Continued)

FOREIGN PATENT DOCUMENTS

WO 2016059063 A1 4/2016

OTHER PUBLICATIONS

ETSI, "LTE; Evolved Universal Terrestrial Radio Access (E-UTRA); Radio Resource Control (RRC); Protocol specification (3GPP TS 36.331 version 13.0.0 Release 13)," ETSI TS 136 331 V13.0.0, pp. 70-89, (Jan. 2016).

*Primary Examiner* — Jeffrey M Rutkowski
*Assistant Examiner* — Andre Tacdiran

(57) ABSTRACT

Disclosed are methods and systems to facilitate variation of timer duration. In particular, a relay node (RN) may be configured to be served by a base station (BS) over a relay backhaul air interface and may be configured to serve user equipment devices (UEs) over a relay coverage air interface. Also, the RN may be configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface. With these arrangements, the RN may determine a count of how many UEs are being served by the RN over the relay coverage air interface and may set the timer duration based on the determined count of UEs.

20 Claims, 9 Drawing Sheets

(56) References Cited

U.S. PATENT DOCUMENTS

| | | | |
|---|---|---|---|
| 2013/0171986 A1* | 7/2013 | Shimizu | H04B 7/155 455/423 |
| 2013/0336136 A1* | 12/2013 | Meylan | H04L 43/08 370/252 |
| 2014/0307542 A1* | 10/2014 | Fujishiro | H04W 76/046 370/225 |
| 2017/0013653 A1* | 1/2017 | Suzuki | H04W 24/04 |
| 2017/0156164 A1* | 6/2017 | Chami | H04W 76/007 |

\* cited by examiner

DYNAMIC VARIATION OF RADIO LINK FAILURE TIMER DURATION FOR RELAY BACKHAUL LINK, WITH TIMER DURATION BEING SET BASED ON NUMBER OF SERVED UES

BACKGROUND

Unless otherwise indicated herein, the description provided in this section is not itself prior art to the claims and is not admitted to be prior art by inclusion in this section.

A typical cellular wireless network includes a number of base stations (BSs) each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station (BS) may be coupled with network infrastructure that provides connectivity with one or more transport networks, such as the public switched telephone network (PSTN) and/or the Internet for instance. With this arrangement, a UE within coverage of the network may engage in air interface communication with a BS and may thereby communicate via the BS with various remote network entities or with other UEs served by the BS.

Further, a cellular wireless network may operate in accordance with a particular air interface protocol (radio access technology), with communications from the BSs to UEs defining a downlink or forward link and communications from the UEs to the BSs defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In practice, BSs in a cellular wireless network can be physically arranged in various ways. For instance, BSs may be co-located with each other by having their antenna structures at largely the same geographic location (within a defined tolerance, for instance). By way of example, a single cell site could be arranged to define two BSs with separate antenna structures on a common antenna tower or other base structure. And in another example, a single physical BS (possibly with a single antenna structure) that provides service separately on first and second carriers could be considered to define the two separate BSs, one operating on the first carrier and the other operating on the second carrier. Alternatively, BSs in a cellular wireless network can be distributed at some distance from each other. In particular, the antenna structure of a given BS may be located at a geographic location that is at some non-zero distance from the antenna structure of another BS.

With these arrangements, the BSs of a wireless service provider's network would ideally provide seamless coverage throughout a market area, so that UEs being served by the system could move from coverage area to coverage area without losing connectivity. In practice, however, it may not be possible to operate a sufficient number of BSs or to position the BSs in locations necessary to provide seamless coverage. As a result, there may be holes in coverage.

One way to help to resolve this problem is to operate a relay node (RN) that extends the range of a BS's coverage area so as to partially or completely fill a coverage hole. Such an RN may be configured with a wireless relay backhaul air interface (e.g., including a radio resource control (RRC) connection) for communicating with and being served by the BS in much the same way that a UE does, and a wireless relay access interface for communicating with and serving one or more UEs in much the same way that a BS does. Further, the RN may include control logic for actively bridging the backhaul communications with the access communications. The RN may thus receive and recover downlink communications from the donor BS and may transmit those communications to the UEs served by the RN, and may likewise receive and recover uplink communications from UEs served by the RN and may transmit those communications to the BS. Consequently, a wireless service provider may conveniently employ such RNs throughout a region to help efficiently fill coverage holes and improve service quality.

When an RN is being served by a BS over a relay backhaul air interface, the RN may be configured to detect one or more threshold errors in communication on the relay backhaul air interface and to respond to such a threshold error in communication by spending a particular time period trying to overcome the threshold error in communication.

By way of example, the RN may detect a threshold problem with the relay backhaul air interface, such as by detecting a threshold number of instances in which the RN is unable to decode data received by the RN from the serving BS over the relay backhaul air interface for example. And in response to detecting the threshold problem, the RN may start a timer that runs for a timer duration, which according to one or more industry standards may be referred to as a T310 timer. While the T310 timer is running, the RN may undergo a phase (which, for simplicity, could be referred to as a "problem recovery" phase) during which the RN checks whether or not the threshold problem is improving or has otherwise been resolved. If the RN determines that the threshold problem is improving or has otherwise been resolved before expiration of the T310 timer duration (e.g., the RN detects a threshold number of instances in which the RN was able to decode data received from the serving BS), then the RN may responsively stop the T310 timer before expiration of the T310 timer duration and may then resume normal operation while continuing to be served by the BS.

As another example, the RN may detect expiration of the T310 as a further threshold error in communication (and perhaps as an indication that the threshold problem has not improved or otherwise been resolved before expiration of the T310 timer). And in response to expiration of the T310 timer, the RN may responsively start another timer that could be referred to as a T311 timer according to one or more industry standards and that runs for a T311 timer duration (which could be the same as or different from the T310 timer duration).

Upon starting the T311 timer, the RN may initiate an RRC connection re-establishment procedure to re-establish the RRC connection while the RN remains RRC connected and thus without the RN having to transition to an RRC idle mode. As part of the RRC connection re-establishment procedure, the RN may send an RRC connection re-establishment request message respectively to each of one or more target BSs, such as to one or more BSs found on a BS neighbor list stored by the RN (e.g., perhaps including the serving BS itself). In doing so, the RN could transmit such a request to the serving BS over the RRC connection and to a BS other than the serving BS over a physical uplink control channel (PUCCH) that the other BS may use to monitor for such request messages.

Any BS that receives an RRC connection re-establishment request message from the RN may respond with an RRC connection re-establishment response, which may either specify acceptance of the re-establishment request or specify rejection of the re-establishment request (e.g., due to the BS being unable to obtain sufficient information about the RN). In some cases, however, one or more BSs may not respond due to such BSs not successfully receiving the request message and/or for other reasons. Nonetheless, the RN may be configured to take certain action depending on whether and/or how one or more BSs respond to the transmitted request.

In particular, if the RN receives from a BS an RRC connection re-establishment response message accepting the RN's RRC connection re-establishment request before expiration of the T311 timer, then the RN may perhaps engage in control signaling with the responding BS and may then resume normal operation while being be served over an RRC connection by that responding BS. However, if the RN detects expiration of the T311 timer and has not received from any BS an RRC connection re-establishment response message accepting the RN's RRC connection re-establishment request, then the RN may respond to expiration of the T311 timer duration by transitioning from operating in an RRC connected mode to operating in an RRC idle mode. While the RN then operates in the RRC idle mode, the RN may scan for possible coverage and, once the RN finds coverage, the RN may engage in attach and/or other signaling to establish a new RRC connection with a target BS defining the coverage area, which may be the same BS on which the RN was already being served or may be another BS other than the BS on which the RN was already being served.

OVERVIEW

According to one or more standards, the above-mentioned timer durations are generally broadcasted by the serving BS to the various entities (e.g., UEs and/or RNs) being served by the BS, including to the RN at issue. So once the RN receives from the serving BS a broadcasted message including information specifying at least one such timer duration, the RN may then configure the relevant timer with the specified timer duration such that the timer then runs for the specified timer duration once such timer is ultimately started. In this manner, the RN tends to have limited control over the timer duration(s) and generally tends to set the same timer duration(s) as those being set by other entities also being served by the BS.

When the RN encounters a problem on the relay backhaul air interface and responsively takes steps as discussed above in attempt to resolve the problem, the extent of time spent to resolve the problem may depend on the set timer duration(s). For example, a situation may arise in which the encountered problem simply cannot be resolved during the above-mentioned problem recovery phase regardless of the length of the T310 timer duration, yet may be resolved at some point during the RRC connection re-establishment procedure. Hence, the T310 timer duration may affect the extent of time ultimately spent to resolve the problem. In another example, a situation may arise in which the encountered problem simply cannot be resolved during the problem recovery phase regardless of the length of the T310 timer duration and also simply cannot be resolved during the RRC connection re-establishment procedure regardless of the length of the T311 timer duration, yet may ultimately be resolved through establishment of a new RRC connection after expiration of the T311 timer duration. Hence, the T310 and T311 timer durations may sometimes both affect the extent of time ultimately spent to resolve the problem.

Given that the RN may itself serve UEs through various relay access links, any UE being served by the RN may itself experience problems (e.g., a reduced quality of service) due to the problem on the relay backhaul air interface and may experience such problems for as long as the problem on the relay backhaul air interface is being resolved. And the greater the number of UEs that are being served by the RN, the greater the number of UEs that may end up experiencing such problems. As a result, a problem on the relay backhaul air interface may lead to a reduction in quality of service for many UEs that tend to rely on the RN to help efficiently fill coverage holes and to improve service quality.

Disclosed herein are methods and systems to help avoid situations in which problems on the relay backhaul air interface result in problems that directly affect many RN-served UEs for extended periods of times. In particular, the RN may determine a count of how many UEs are being served by the RN and, based on this determined count, the RN may then set at least one timer duration, such as for one or both of the T310 and T311 timers for instance. Moreover, the relationship between the count of UEs and the timer duration may be set such that the timer duration decreases when the number of UEs being served by the RN increases and vice versa. In this manner, the RN may essentially take quicker steps to resolve a problem on the relay backhaul air interface when a relatively high number of UEs is being served by the RN.

Accordingly, in one respect, disclosed is a method operable in an RN. The RN is configured to be served by a serving BS over a relay backhaul air interface between the BS and the RN and configured to serve one or more UEs over a relay coverage air interface. Further, the RN is configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface. In accordance with the method, an RN may determine a count of how many UEs are being served by the RN over the relay coverage air interface. In turn, the RN may then set the timer duration based on the determined count of UEs. In this way, when the RN then starts the timer in response to detecting the threshold error in communication, the timer runs for the timer duration set based on the determined count of UEs.

In another respect, disclosed is a wireless communication system including a BS, an RN, and a controller. The RN is configured to be served by the BS over a relay backhaul air interface between the BS and the RN and configured to serve one or more UEs over a relay coverage air interface. Further, the RN is configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface. Moreover, the controller is configured to cause the wireless communication system to perform operations. These operations may involve determining a count of how many UEs are being served by the RN over the relay coverage air interface. Furthermore, these operations may also involve setting the timer duration based on the determined count of UEs. In this way, when the RN then starts the timer in response to detecting the threshold error in communication, the timer runs for the timer duration set based on the determined count of UEs.

Further, in another respect, disclosed is a non-transitory computer-readable medium having stored thereon instructions executable by a processor to cause an RN to carry out functions such as those noted above, to facilitate dynamic variation of radio link failure timer duration for relay backhaul link, with the timer duration being set based on the number of served UEs.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
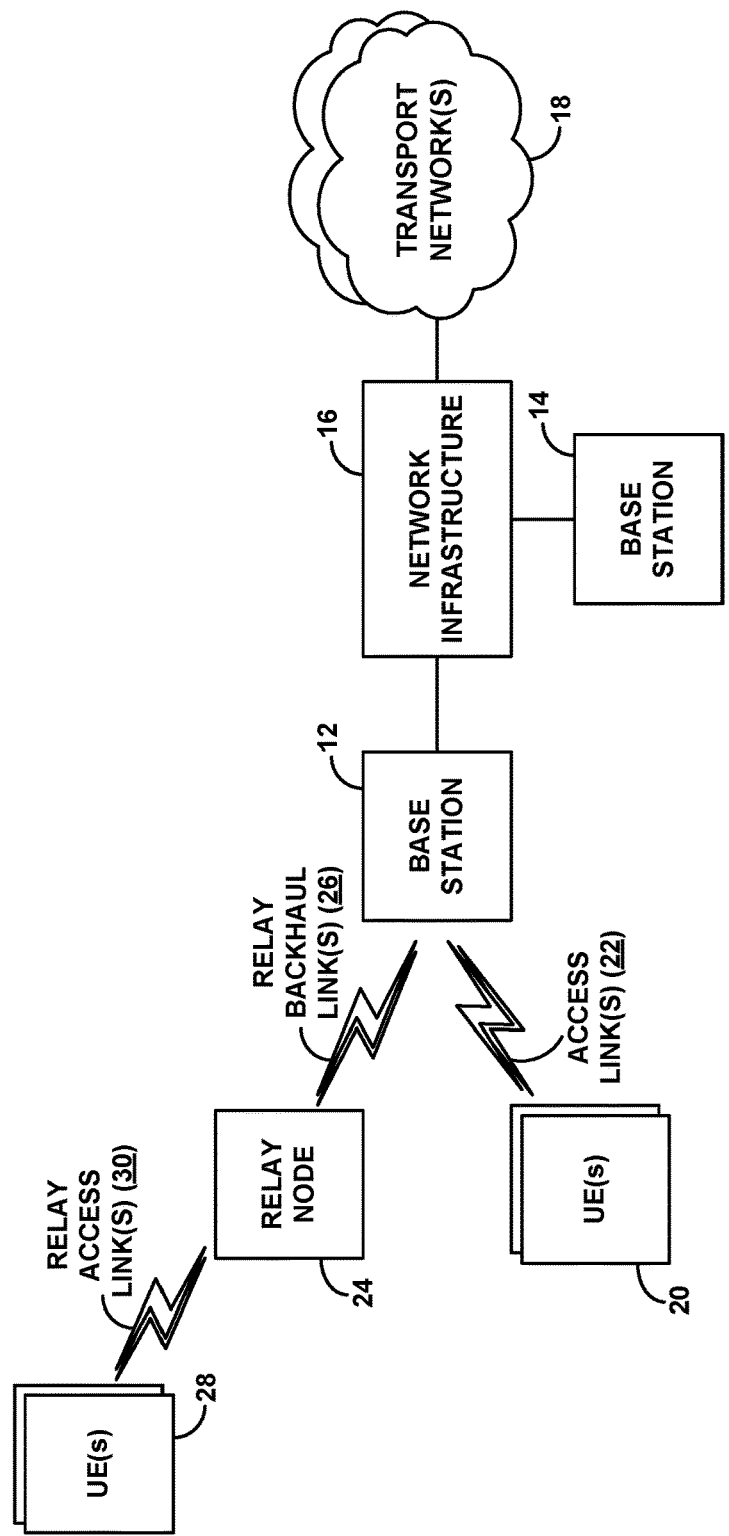
FIG. 1 is a simplified block diagram of an example communication system in which the present method can be implemented.

Referring to the drawings, as noted above, FIG. 1 is a simplified block diagram of an example communication system in which the present method can be implemented. The illustrated communication system includes representative BSs 12 and 14 each interconnected with network infrastructure 16, such as a switch or gateway, providing connectivity with one or more transport networks 18 such as the PSTN and/or the Internet. Also, each such BS may be configured to serve one or more RNs and could thus be referred to as a donor BS once the BS begins to serve one or more such RNs. For instance, FIG. 1 illustrates that the BS 12 may serve one or more UEs 20 respectively over one or more access links 22 and may also serve an RN 24 over one or more relay backhaul links 26. And the RN 24 may then itself serve one or more UEs 28 respectively over one or more relay access links 30 (could also be referred to as relay coverage links 30).

Through this communication system, each of the one or more UEs 20 may engage in communication on the transport network(s) 18 via at least one of the access links 22, the BS 12, and the network infrastructure 16. Also, each of the one or more UEs 28 may engage in communication on the transport network(s) 18 via at least one of the relay access link 30, the RN 24, at least one of the relay backhaul links 26, the BS 12, and the network infrastructure 16. Moreover, the BS 12 (and/or the RN 24) may be licensed or otherwise arranged to engage in wireless communications using one or more carriers each defining a particular frequency or range of frequencies. Given this arrangement, we may thus assume by way of example (and without limitation) that RN 24 is attached with BS 12 and is thus being served with wireless communication service by BS 12. As such, we may assume that the RN 24 has worked with BS 12 to establish an RRC connection defining a radio-link-layer connection between the RN 24 and the BS 12, and that at least one logical bearer has been established between the RN 24 and the network infrastructure 16.

Figure 2:
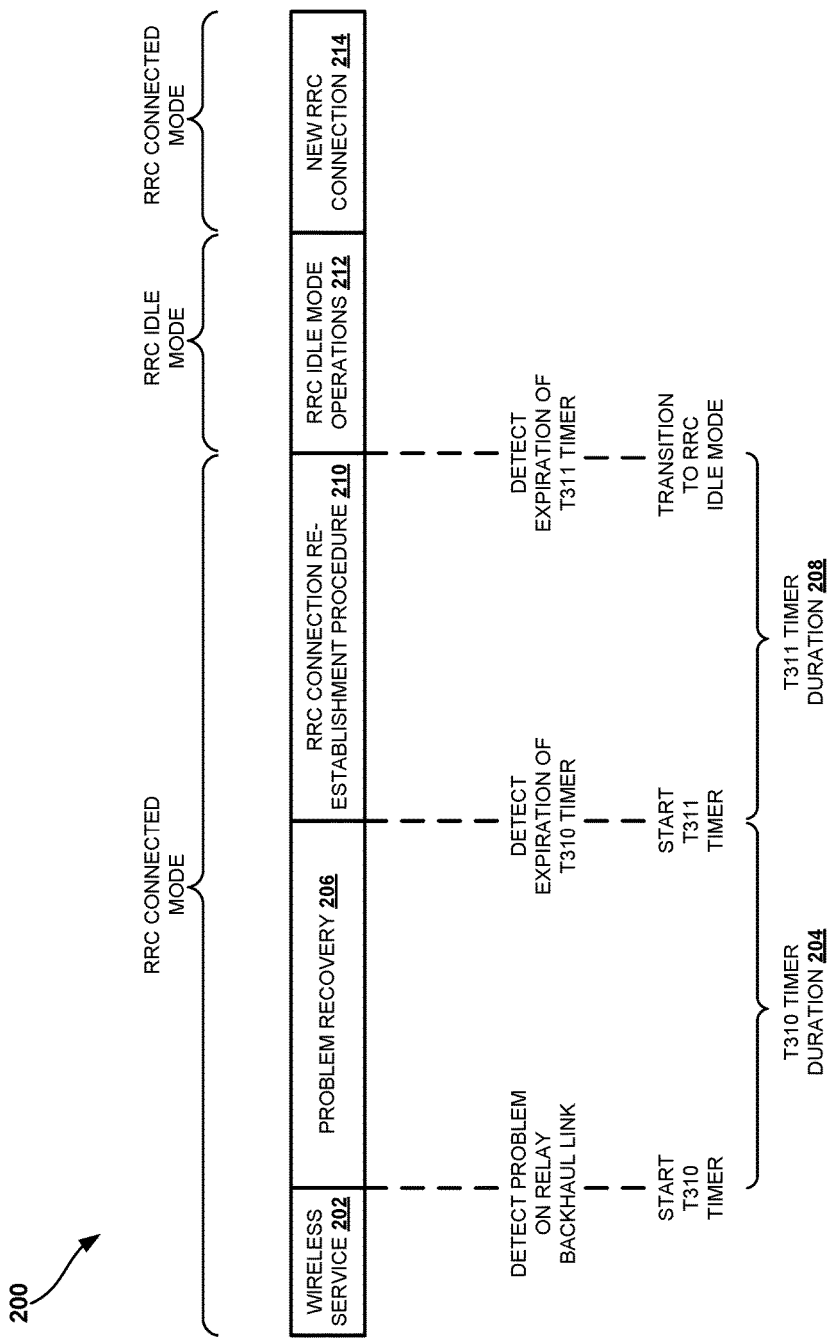
FIG. 2 shows example operations taken by an RN over time to resolve a problem on a relay backhaul air interface, in accordance with an example embodiment.

FIG. 2 next illustrates example operations 200 taken by the RN 24 over time to resolve a problem on a relay backhaul air interface, such as on at least one of the relay backhaul links 26 for instance. In particular, the operations 200 illustrate that the RN 24 may be RRC connected while receiving wireless service 202, such as over a relay backhaul link 26 between the RN 24 and the BS 12 for example. While receiving wireless service 202 over time, the RN 24 may be configured to detect one or more threshold errors in communication on the relay backhaul link 26 and to respond to such a threshold error in communication by spending a certain time period trying to resolve or otherwise overcome the threshold error in communication. For example, the RN may encounter a threshold problem such by detecting a threshold number of instances (e.g., ten instances) in which the RN 24 is unable to decode data received by the RN 24 from the serving BS 12. So in response to detecting the threshold problem, the RN 24 may carry out further operations 200 in an attempt to resolve the threshold problem.

In particular, once the RN 24 detects that there is a threshold problem on the relay backhaul link 26, the RN 24 may remain RRC connected and may responsively start a T310 timer that is set to run for a T310 timer duration 204. While the timer T310 is running, the RN 24 may carry out a phase of problem recovery 206 during which the RN 24 evaluates (e.g., continuously or periodically) whether or not the threshold problem on the relay backhaul link 26 has been resolved. To do so, the RN 24 may determine whether the RN 24 has detected threshold success in communication over the relay backhaul link 26. By way of example, detecting threshold success in communication may involve the RN 24 detecting a threshold number of instances (e.g., five instances) in which the RN 24 has been able to decode the data received by the RN 24 from the BS 12. Other examples are possible as well.

As such, if the threshold problem has been resolved before expiration of the T310 timer duration 204, then the RN 24 may stop the T310 timer before expiration of the T310 timer duration 204 and may then continue receiving wireless service 202 while perhaps no longer experiencing the threshold problem. However, if the RN 24 detects expiration of the T310 timer duration 204 and that the threshold problem on the relay backhaul link 24 has not yet been resolved, then expiration of the T310 timer duration 204 may be indicative of failure of the radio backhaul link 26 and thus of a further threshold error in communication on the relay backhaul link 26. So in response to detecting expiration of the T310 timer duration 204, the RN 24 may take further steps in an attempt to resolve the threshold problem on the relay backhaul link 26 and may do so by engaging in management of the relay backhaul link 26.

In practice, this management of the relay backhaul link 26 may involve the RN 24 initiating an RRC connection re-establishment procedure 210 in an effort to restore normal operation of an RRC connection between the RN 24 and a BS and to do so without causing any RN-served UE that may engage in an ongoing call to experience a call drop. Along with initiation of the RRC connection re-establishment procedure 210, the RN 24 may also start a T311 timer that is set to run for a T311 timer duration 208 during which the RN 24 carries out the RRC connection re-establishment procedure 210. Moreover, the RN 24 may carry out the RRC connection re-establishment procedure 210 while the RN 24 continues operating in the RRC connected mode and may do so by maintaining at least one signaling radio bearer connection arranged to transfer RRC messages and perhaps also other messages. In this manner, any UEs that are being served by the RN 24 and that engage in an ongoing call can continue engaging in the ongoing call as the RN 24 carries out the procedure 210 and can do so without necessarily experiencing a call drop (although such UEs may still experience service interruptions, such as delays in receiving certain data for instance).

As part of the RRC connection re-establishment procedure 210, the RN 24 may transmit an RRC connection re-establishment request message requesting re-establishment of the RRC connection. In doing so, the RN 24 may transmit the request message respectively to one or more target BSs (e.g., simultaneously or at separate times), such as to BSs (e.g., including the serving BS 12 and/or BS 14) listed on a BS neighbor list that the RN 24 has stored or is otherwise configured to refer to. Generally, this request message may include certain information about the RN 24, such as information specifying an identity of the RN 24, configuration of the RN 24, and/or a reason for the request, among other options.

After the RN 24 transmits one or more such request messages, the RN 24 may determine whether or not the RN 24 is able to re-establish an RRC connection with at least one target BS. In particular, if at least one target BS is able to receive the request message, this target BS may respond to the request message by transmitting to the RN 24 an RRC connection re-establishment response message. This response message may specify acceptance of the request or may specify a rejection of the request, which may serve as an indication to the RN 24 of whether or not the RN 24 is able to re-establish an RRC connection with the responding BS. Moreover, a response message that specifies acceptance of the request may also include information for configuring certain parameters of the RRC connection and/or for establishing additional bearers, among other options. In some situations, however, one or more target BSs may not respond to the request message due to such BSs not receiving the transmitted request message for one of various reasons. Nonetheless, the RN 24 may carry out certain actions depending on whether and/or how the BSs respond.

In particular, if the RN 24 receives a response message specifying acceptance of the request, then reception of the response message may serve as an indication to the RN 24 that the RN 24 is able to properly communicate with the responding target BS and that the RN 24 is able to re-establish an RRC connection with the responding BS. Furthermore, if the RN 24 receives response messages from multiple such target BSs, then the RN 24 may select a certain one of the target BSs from which the RN 24 is to ultimately receive wireless service and could select the target BS based on BS priority information found on the neighbor list for instance. In either case, if the RN 24 receives before expiration of the T311 timer duration 208 a response message specifying acceptance of the request, then the RN 24 may responsively send to the responding target BS an RRC connection re-establishment complete indication, may stop the T311 timer, and may engage in further control signaling with the responding target BS in order to ultimately receive service over an RRC connection between the RN 24 and that BS.

In some situations, however, the RN 24 may not receive before expiration of the T311 timer duration 208 any response message specifying acceptance of the request. In these situations, the RN 24 may respond to expiration of the T311 timer duration 208 by engaging in further management of the relay backhaul link 26, such as by releasing the RRC connection and transitioning from operating in the RRC connected mode to operating in an RRC idle mode. While the RN 24 then operates in the RRC idle mode, the RN 24 may carry out one or more RRC idle mode operations 212. In particular, the RN 24 may be configured to detect one or more reference signals each being an indication of certain coverage and may also be configured to evaluate quality of each such coverage. So if the RN 24 detects coverage by just one target BS, the RN 24 may select that target BS. And if the RN 24 detects coverage by two or more target BSs, the RN 24 may then select one of the target BSs according to the coverage quality and/or according to other factors. In either case, once a target BS is selected, the RN 24 may work to establish a new RRC connection 214 with the selected target BS and may thus again operate in an RRC connected mode.

Given the above-described operations 200 and that UEs being served by the RN 24 may also experience problems resulting from the problem on the relay backhaul link 26, at issue is then how the RN 24 can work minimize the extent to which these problems are being experienced by RN-served UEs. The present disclosure provides for dynamic variation of one or more timers (e.g., the T310 timer and/or the T311 timer) according to factors such as the number of UEs being served by the RN 24, among others.

In accordance with the disclosure, as noted, the RN 24 may determine a count of how many UEs are being served by the RN 24 over one or more relay access links 30. The RN 24 may do so in one of various ways. For example, the RN 24 may include a counter that indicates a count of UEs currently being served by the RN 24. In particular, each time that the RN 24 begins serving a UE (e.g., establishes a new RRC connection with the UE), the RN 24 may increment the counter by a value of 1 (one). And each time that the RN 24 stops serving a UE (e.g., releases the RRC connection with the UE), the RN 24 may decrement the counter by a value of 1. With this arrangement, the RN 24 may refer to the counter to determine the count of how many UEs are currently being served by the RN 24. Other examples are possible as well.

Once the RN 24 determines the count of how many UEs are being served by the RN 24, the RN 24 may use the determined count as basis for determining at least one timer duration for at least one timer. For instance, the RN 24 may determine a T310 timer duration based on the determined count and/or may determine a T311 timer duration based on the determined count. Accordingly, the RN 24 may determine such timer durations in various ways. By way of example, the RN 24 may have stored thereon or may otherwise have access to mapping data that maps each of various counts with a respective timer duration. Moreover, the RN 24 may have mapping data that the RN 24 could use to determine a T310 timer duration and/or may have mapping data that the RN 24 could use to determine a T311 timer duration.

With this arrangement, the RN 24 may refer to such mapping data and, in doing so, the RN 24 may make a determination that the mapping data maps the determined count of UEs with a particular timer duration. Hence, the RN 24 may use this determination as basis for setting the particular timer duration for a corresponding timer. In this manner, when the RN 24 then ultimately starts the corresponding timer in response to detecting a threshold error in communication, that timer runs for the particular timer duration.

Furthermore, the mapping data may exhibit a certain the relationship between the count of UEs and the timer durations, specifically being arranged such that the timer duration decreases (e.g., by various time increments) when the count of UEs being served by the RN 24 increases (e.g., by various count increments) and vice versa. For instance, the mapping data may map a first count with a first timer duration and may also map a second count that is a higher than the first count with a second timer duration that is shorter than the first timer duration. In this instance, when the determined count is the first count, then the RN 24 may responsively set the first timer duration in accordance with this mapping data. And when the determined count is the second count, then the RN 24 may responsively set the second timer duration in accordance with this mapping data. In this manner, the RN 24 may be configured to arrange the timer duration(s) such that the more UEs are being served by the RN 24, the more quickly the RN 24 transitions between the gradual steps described herein to ultimately resolve a threshold problem on the relay backhaul air interface.

Figure 3:
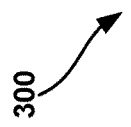
FIG. 3 is a table that illustrates mapping of certain counts of UEs with certain T310 timer durations, in accordance with an example embodiment.

FIG. 3 illustrates example mapping data 300 that maps each of various counts of UEs with respective T310 timer durations. According to this example mapping data 300, when the RN 24 serves a single UE or concurrently serves two UEs, the RN 24 may set a T310 timer duration of 3.1 seconds. Also, when the RN 24 concurrently serves anywhere between three to five UEs, the RN 24 may set a T310 timer duration of 3 seconds. Additionally, when the RN 24 concurrently serves six UEs or concurrently serves seven UEs, the RN 24 may set a T310 timer duration of 2.5 seconds. Further, when the RN 24 concurrently serves anywhere between eight UEs to ten UEs, the RN 24 may set a T310 timer duration of 1.9 seconds. While various examples have been provided, these examples should not be viewed as limiting as other examples are possible as well.

Figure 4:
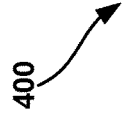
FIG. 4 is a table that illustrates mapping of certain counts of UEs with certain T311 timer durations, in accordance with an example embodiment.

FIG. 4 next illustrates example mapping data 400 that maps each of various counts of UEs with respective T311 timer durations. According to this example mapping data 400, when the RN 24 serves a single UE or concurrently serves two UEs, the RN 24 may set a T311 timer duration of 2.2 seconds. Also, when the RN 24 concurrently serves anywhere between three to five UEs, the RN 24 may set a T311 timer duration of 2 seconds. Additionally, when the RN 24 concurrently serves six UEs or concurrently serves seven UEs, the RN 24 may set a T311 timer duration of 1.6 seconds. Further, when the RN 24 concurrently serves anywhere between eight UEs to ten UEs, the RN 24 may set a T311 timer duration of 1.4 seconds. While various examples have been provided, these examples should not be viewed as limiting as other examples are possible as well.

In a further aspect, the RN 24 may be configured to consider other factors as basis for determining a timer duration, such as factors considered in addition to the count of UEs being served by the RN 24. Without limitation, these factors may include a service level being provided to each UE being served by the RN and/or an extent of communication between each UE and the RN 24, among other possibilities. These factors are described below in more detail.

In one case, the RN 24 may determine a service level respectively being provided to each UE being served by the RN 24 and may use one or more such service levels as an additional factor for determining a timer duration. In practice, the RN 24 may determine a service level in various ways. For instance, the RN 24 may receive from a certain UE being served by the RN 24 information specifying a Quality of Service (QoS) Class Identifier (QCI). As such, the RN 24 may use one or more such specified QCIs to adjust a timer duration already determined based on the count of UEs.

By way of example, the RN 24 may have stored thereon or may otherwise refer to mapping data that maps each of various QCIs with a respective timer duration adjustment. Given that different QCIs have different corresponding priority levels, such mapping data may be arranged so that a timer duration is reduced when at least one UE being served by the RN 24 is reporting a relatively high priority (e.g., nine on a scale of zero to ten) QCI. Whereas, the mapping data may be arranged so that, if the highest priority among all reported QCIs is a relatively low priority (e.g., a two on the scale of zero to ten) QCI, then a timer duration is maintained, increased, or reduced by a lesser amount compared to an amount by which the timer duration is reduced when a relatively high priority QCI is being reported.

Figure 5:
FIG. 5 is a table that illustrates mapping of certain QCI priority levels with certain timer duration adjustments, in accordance with an example embodiment.

In a more specific example, FIG. 5 illustrates mapping data 500 showing that, if the highest priority level among all reported QCIs is between a six and ten on a scale of zero to ten, then the RN 24 may be arranged to reduce a timer duration (e.g., initially determined based on the count of UEs) by one second. Whereas, if the highest priority level among all reported QCIs is between a zero and five on the scale of zero to ten, then the RN 24 may be arranged to maintain the same timer duration. In this manner, the RN 24 may be configured to arrange the timer duration(s) such that when a higher priority QCI is being reported, the more quickly the RN 24 transitions between the gradual steps described herein to ultimately resolve a problem on the relay backhaul air interface. While various examples have been provided, these examples should not be viewed as limiting as other examples are possible as well.

In another case, the RN 24 may respectively determine an extent of communication between each UE and the RN 24 and may use one or more such determined extents of communication as additional factor for determining a timer duration. In practice, the RN 24 may determine an extent of communication in various ways. For instance, the RN 24 may evaluate a size of data scheduled to be transmitted to a certain UE over a certain period of time. This data size may define a quantity of data communications scheduled to be transmitted. As such, the RN 24 may use one or more such data sizes to adjust a timer duration already determined based on the count of UEs.

By way of example, the RN 24 may have stored thereon or may otherwise refer to mapping data that maps each of various data sizes with a respective timer duration adjustment. The mapping data may be arranged so that a timer duration is reduced when at least one UE being served by the RN 24 is receiving data of a relatively large size (e.g., a data size larger than one hundred megabytes). Also, the mapping data may be arranged so that, if the largest data size being received among all UEs being served by the RN 24 is a relative small data size (e.g., a data size smaller than one hundred megabytes), then the timer duration is maintained, increased, or reduced by a lesser amount compared to an amount by which the timer duration is reduced when a relatively large data size is being received by at least one RN-served UE.

Figure 6:
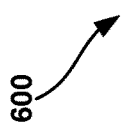
FIG. 6 is a table that illustrates mapping of certain data sizes with certain timer duration adjustments, in accordance with an example embodiment.

In a more specific example, FIG. 6 illustrates mapping data 600 showing that, if the largest data size being received among all RN-served UEs is a data size over one hundred megabytes, then the RN 24 may be arranged to reduce a timer duration (e.g., initially determined based on the count of UEs) by one and a half seconds. Whereas, if the largest data size being received among all RN-served UEs is a data size between zero and one hundred megabytes, then the RN 24 may be arranged to maintain the same timer duration. In this manner, the RN 24 may be configured to arrange the timer duration(s) such that when a relatively large data size is being transmitted to at least one RN-served UE, the more quickly the RN 24 transitions between the gradual steps described herein to ultimately resolve a problem on the relay backhaul air interface. While various examples have been provided, these examples should not be viewed as limiting as other examples are possible as well.

In some cases, the RN 24 may consider both the service levels and the extents of communication as basis for determining or otherwise adjusting a timer duration. In particular, the RN 24 may determine a service level for each RN-served UE and may determine an extent of communication for each RN-served UE. Respectively for each RN-served UE, the RN 24 may determine a weight to be applied to the determined extent of communication and may do so based on the respective service level. For instance, the RN 24 may have stored thereon or may otherwise have access to mapping data that maps each of various service levels to a respective weight to be applied. This mapping data may be arranged so that lower service levels result in lower weights to be applied and vice versa. Once the weight has been determined, the RN 24 may then apply the determined weight to the respective extent of communication to result in a weighted extent of communication.

For example, the RN 24 may determine that a particular UE has reported a relatively lower priority QCI and that this QCI is mapped with a weight of 0.5 (one half). Also, the RN 24 may determine that a data size to be transmitted to the particular UE is 500 (five hundred) megabytes. So in this example, the RN 24 may determine that the weighted data size is 250 (two hundred and fifty) megabytes. In another example, the RN 24 may determine that a particular UE has reported a relatively higher priority QCI and that this QCI is mapped with a weight of 1.5 (one and a half). Also, the RN 24 may determine that a data size to be transmitted to the particular UE is 300 (three hundred) megabytes. So in this example, the RN 24 may determine that the weighted data size is 450 (four hundred and fifty) megabytes.

Once weighted extents of communication have been determined, the RN 24 may then determine or otherwise adjust a timer duration based on one or more such weighted extents of communication. For example, the RN 24 may make adjustment in accordance with the above-described mapping data 600 that maps each of various data sizes with a respective timer duration adjustment. In this case, however, the RN 24 may use the weighted data sizes as basis for the timer duration adjustment. In this manner, the RN 24 may adjust or otherwise set timer duration(s) while taking into consideration if a certain UE is receiving a relatively high extent of low priority data and/or if a certain UE is receiving a relatively low extent of high priority data, among other possibilities. Other cases and aspects are possible as well.

While the present disclosure has been described above in the context of the RN 24 carrying out the various operations, another entity of a wireless communication system (e.g., the serving BS 12) may also carry the present disclosure. In doing so, the entity may obtain and/or transmit relevant information from/to the RN 24 to help facilitate the various operations. For instance, the BS 12 may obtain from the RN 24 information indicating the number of UEs being served by the RN 24. And once the BS 12 determines a timer duration based on the number of UEs being served by the RN 24, the BS 12 may transmit to the RN 24 information specifying the determined timer duration, so that the RN 24 can then configure the appropriate timer with the specified timer duration. Other arrangements are also possible.

Figure 7:
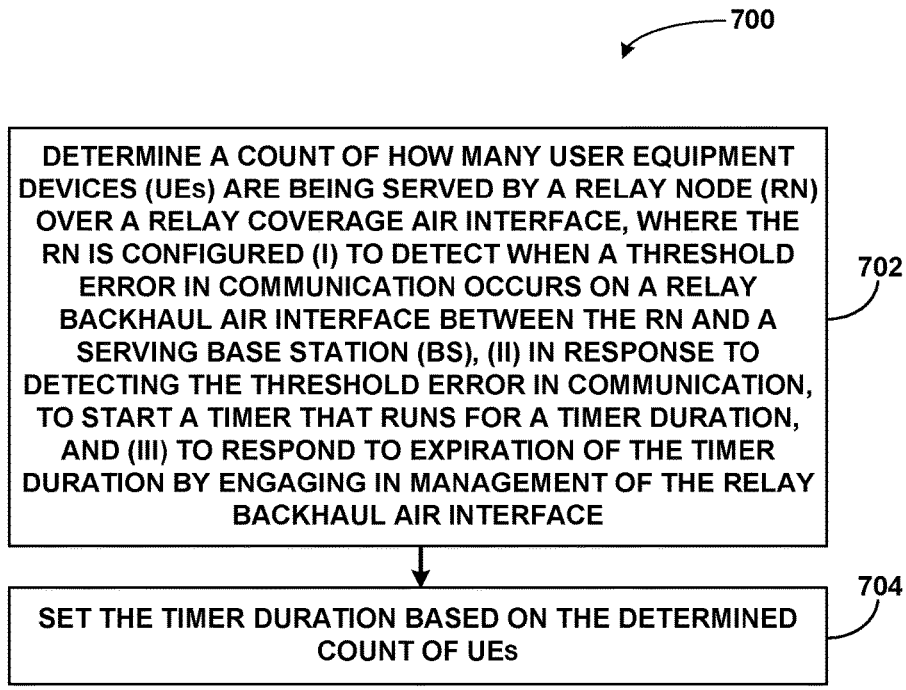
FIG. 7 is a flowchart illustrating a method to facilitate dynamic variation of timer duration, in accordance with an example embodiment.

FIG. 7 is next a flow chart illustrating a method according to an example embodiment. Illustrative methods, such as method 700, may be carried out in whole or in part by component(s) and/or arrangement(s) in a wireless communication system, such as by the one or more of the components of the representative network shown in FIG. 1, with one or more of the components of the BS shown in FIG. 8 and further discussed below, and/or with one or more of the components of the RN shown in FIG. 9 and further discussed below. However, it should be understood that example methods, such as method 700, may be carried out by other entities or combinations of entities as well as in other arrangements, without departing from the scope of the disclosure.

In particular, method 700 may be operable in an RN configured to be served by a serving BS over a relay backhaul air interface between the BS and the RN and also configured to itself serve one or more UEs over a relay coverage air interface. Accordingly, as shown by block 702 in FIG. 7, method 700 involves determining a count of how many UEs are being served by the RN over the relay coverage air interface. And as also shown by block 702 in FIG. 7, the method involves the RN being configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface. At block 704, method 700 then involves setting the timer duration based on the determined count of UEs. In this way, when the RN then starts the timer in response to detecting the threshold error in communication, the timer runs for the timer duration set based on the determined count of UEs.

Figure 8:
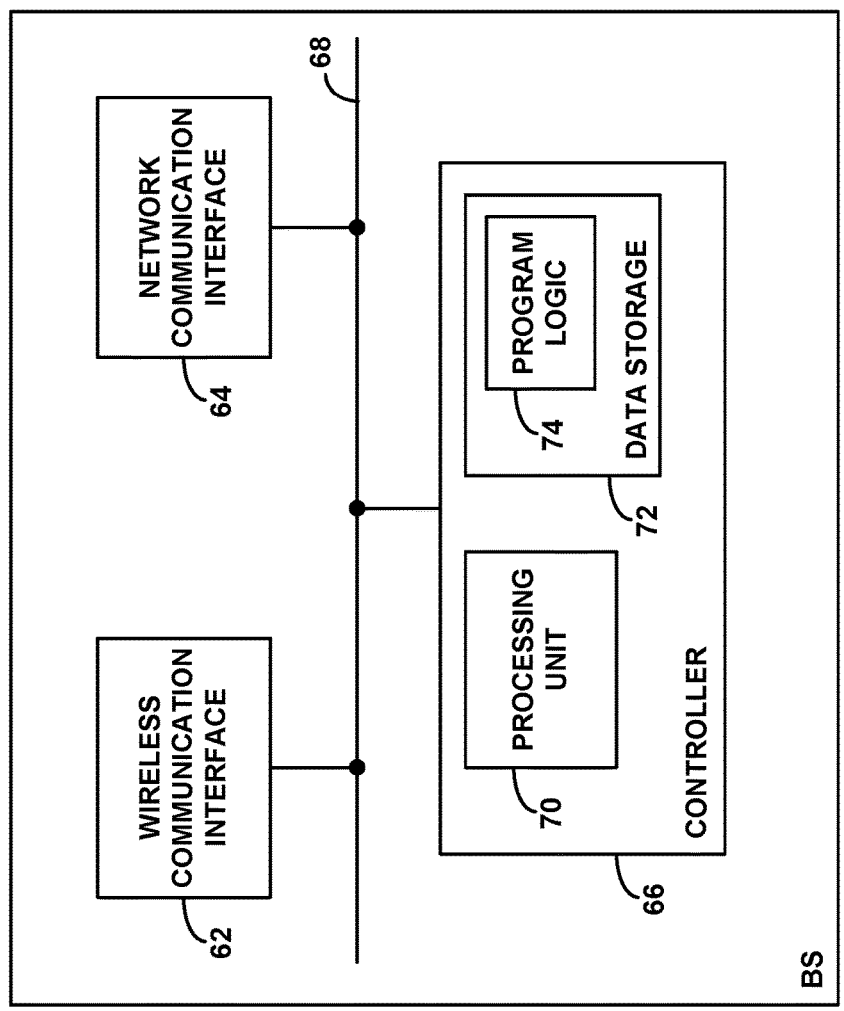
FIG. 8 is a simplified block diagram of a BS operable in the present method.

FIG. 8 is next a simplified block diagram of a representative BS, such as a BS including taking the form of a base transceiver station, of an access node, of an access point, of a Node-B, or of an eNodeB, for instance (whether macro, femto or the like), illustrating some of the components that can be included in such an entity configured to operate in accordance with the present disclosure. As shown in FIG. 8, the representative BS includes at least one wireless communication interface 62, at least one network interface 64, and at least one controller 66, all of which may be integrated together in various ways and/or coupled together by a system bus, network, or other connection mechanism 68.

Each wireless communication interface 62 may function to wirelessly serve various entities, such as UEs and an RN as discussed above, communicating over a access link with one or more UEs and over a relay backhaul link with an RN. As such, each wireless communication interface 62 may comprise at least one antenna arrangement (not shown) for the representative BS, which may be tower mounted, and associated components such as at least one power amplifier and at least one cell site modem (not shown), so as to transmit and receive bearer and control data. Each network interface 64 may comprise a wired or wireless interface for communicating with various network infrastructure.

Controller 66 may then function to cause the BS to carry out various functions, such as those discuss herein. As such, controller 66 could take various forms. For instance, as shown, the controller 66 may include a processing unit 70 (e.g., one or more general purpose or special purpose processors) and data storage 72 (e.g., volatile and/or non-volatile storage such as magnetic, optical, flash or other storage) holding program logic 74 (e.g., machine language instructions) executable by the processing unit to carry out the various BS functions.

Figure 9:
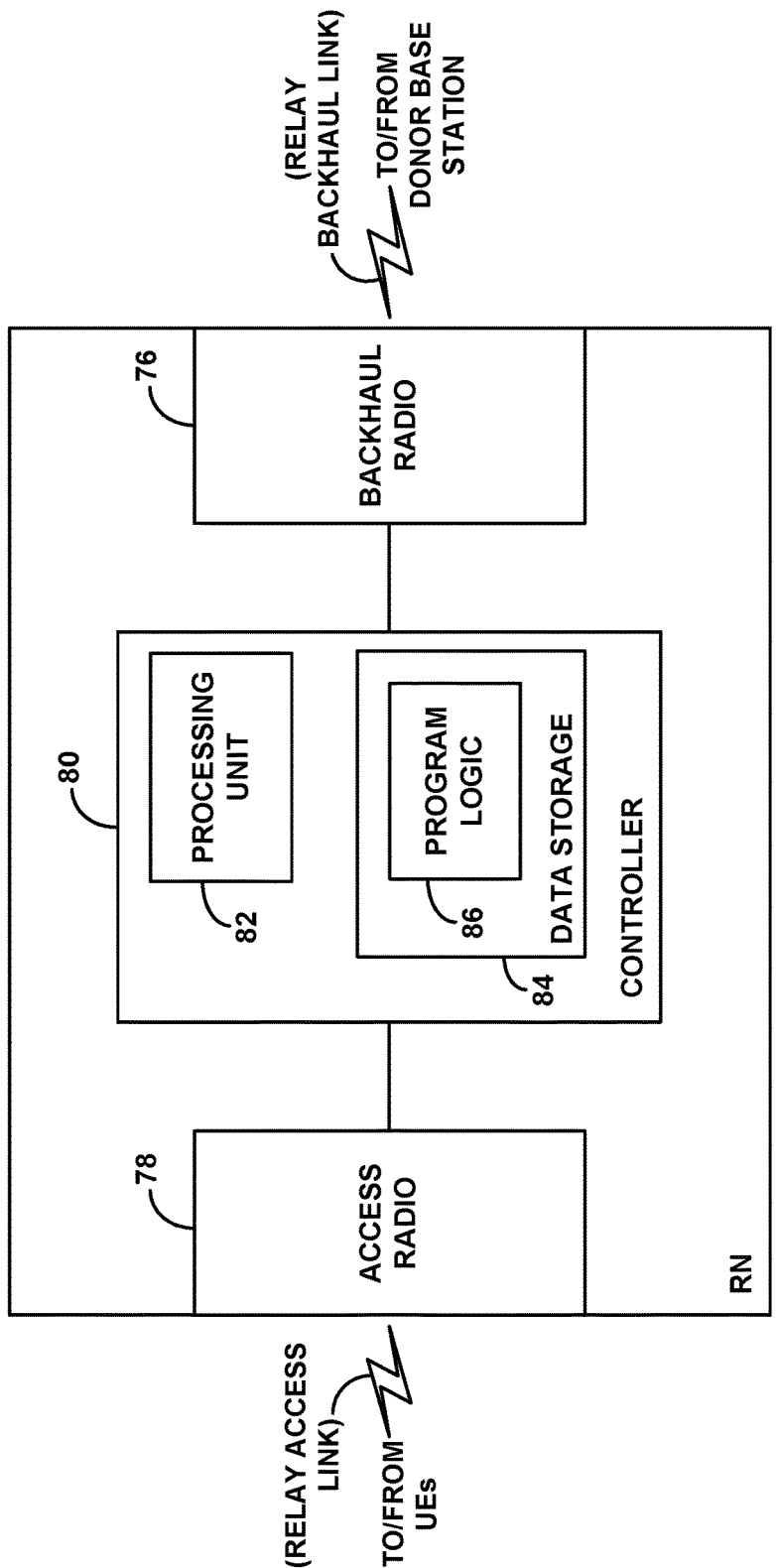
FIG. 9 is a simplified block diagram of an RN operable in the present method.

Finally, FIG. 9 is a simplified block diagram of a representative RN, illustrating some of the components that can be included in such an entity. As shown, the representative RN includes a wireless communication module comprising a backhaul radio 76 and an access radio 78, and a controller 80 for bridging communications between the backhaul radio and access radio. Although the figure depicts these components as discrete blocks, the components may be integrated together in various ways or provided in other forms. For instance, the backhaul radio 76 and access radio 78 may be integrated together, perhaps on a single chipset. Further, the controller 80 may be integrated with either or both of the radios. Still further, although the figure depicts the controller with direct links to each of the radios, in an alternative arrangement the RN may include a system bus, network, or other connection mechanism to which the radios and controller may be communicatively linked. Other arrangements are possible as well.

In the illustrated RN, the backhaul radio 76 may function to engage in backhaul wireless communication with a donor BS via a relay backhaul link. To facilitate this, backhaul radio 76 may be largely the same type of radio that would be included in a UE designed to be served by a BS. The backhaul radio 76 may thus include an antenna arrangement (not shown) and associated components to facilitate transmitting and receiving bearer and control data in communication with the donor BS. The access radio 78, on the other hand, may function to engage in access wireless communication with the one or more UEs via a relay access link. To facilitate this, the access radio 78 may be largely the same type of radio that would be included in a BS designed to serve such UEs. The access radio 78 may thus include an antenna arrangement (not shown) and associated components to facilitate transmitting and receiving bearer and control data in communication with the one or more UEs.

Controller 80, in turn, may function to actively bridge communications of the backhaul radio 76 with communications of the access radio 78, and thus to bridge certain relay backhaul link communications with certain relay access communications. In the example arrangement shown, controller 80 includes a processing unit 82 (e.g., one or more general purpose or special purpose processors) and data storage 84 (e.g., volatile and/or non-volatile storage such as magnetic, optical, flash or other storage) holding program logic 86 (e.g., machine language instructions) executable by the processing unit to carry out various RN functions.

Exemplary embodiments have been described above. It should be understood, however, that variations from these embodiments are possible, while remaining within the true spirit and scope of the invention.

We claim:

1. In a relay node (RN) configured to be served by a serving base station (BS) over a relay backhaul air interface between the BS and the RN and configured to serve one or more user equipment devices (UEs) over a relay coverage air interface, a method comprising:

determining, by the RN, a count of how many UEs are being served by the RN over the relay coverage air interface, wherein the RN is further configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface;

setting, by the RN, the timer duration of the timer based on the determined count of UEs; and in response to detecting the threshold error in communication on the relay backhaul interface, starting, by the RN, the timer to run for the timer duration set based on the determined count of UEs.

2. The method of claim 1, wherein detecting when the threshold error in communication occurs on the relay backhaul air interface comprises detecting a threshold number of instances in which the RN is unable to decode data received by the RN from the serving BS over the relay backhaul air interface.

3. The method of claim 1, wherein the RN is further configured (i) to detect, before expiration of the timer duration, that the threshold error in communication is no longer occurring on the relay backhaul air interface and (ii) to stop the timer in response to detecting, before expiration of the timer duration, that the threshold error in communication is no longer occurring on the relay backhaul air interface.

4. The method of claim 1, wherein the relay backhaul air interface comprises a radio resource control (RRC) connection, wherein engaging in management of the relay backhaul air interface comprises initiating an RRC connection re-establishment procedure that includes transmitting to at least one target BS an RRC connection re-establishment request message, and wherein the at least one target BS comprises one or more of the serving BS and a BS other than the serving BS.

5. The method of claim 1, wherein the relay backhaul air interface comprises a radio resource control (RRC) connection, wherein detecting when the threshold error in communication occurs on the relay backhaul air interface comprises determining that the RN initiated an RRC connection re-establishment procedure that includes transmitting to at least one target BS an RRC connection re-establishment request message, and wherein the at least one target BS comprises one or more of the serving BS and a BS other than the serving BS.

6. The method of claim 5, wherein the RN is further configured, before expiration of the timer duration, to (i) receive from the at least one target BS an RRC connection re-establishment acceptance message and (ii) stop the timer in response to receiving the RRC connection re-establishment acceptance message, wherein the RRC connection re-establishment acceptance message is received in response to the RRC connection re-establishment request message.

7. The method of claim 1, wherein the relay backhaul air interface comprises a radio resource control (RRC) connection, wherein engaging in management of the relay backhaul air interface comprises causing the RN to release the RRC connection and to transition to operating in an RRC idle mode, wherein, while the RN operates in the RRC idle mode, the RN is configured to engage in control signaling to establish a new RRC connection with a target BS, and wherein the target BS comprises the serving BS or a BS other than the serving BS.

8. The method of claim 1, wherein the RN is configured to refer to a data storage containing mapping data that maps (i) each of various counts of UEs being served by the RN with (ii) a respective timer duration, and wherein setting the timer duration based on the determined count of UEs comprises:
  making a determination that the mapping data maps the determined count of UEs with a particular timer duration; and
  based on the determination, setting the particular timer duration, whereby, when the RN then starts the timer in response to detecting the threshold error in communication, the timer runs for the particular timer duration.

9. The method of claim 1,
  wherein the RN is configured to refer to a data storage containing mapping data that maps (i) a first timer duration with a first count of UEs and (ii) a second timer duration with a second count of UEs,
  wherein the second count of UEs is higher than the first count of UEs,
  wherein the second timer duration is shorter than the first timer duration, and
  wherein setting the timer duration based on the determined count of UEs comprises referring to the mapping data and setting the timer duration in accordance with the mapping data.

10. The method of claim 9, wherein determining the count comprises determining that the RN is serving the first count of UEs, and wherein setting the timer duration in accordance with the mapping data comprises:
  making a determination that the mapping data maps the first timer duration with the first count of UEs; and
  based on the determination, setting the first timer duration, whereby, when the RN then starts the timer in response to detecting the threshold error in communication, the timer runs for the first timer duration.

11. The method of claim 9, wherein determining the count comprises determining that the RN is serving the second count of UEs, and wherein setting the timer duration in accordance with the mapping data comprises:
  making a determination that the mapping data maps the second timer duration with the second count of UEs; and
  based on the determination, setting the second timer duration, whereby, when the RN then starts the timer in response to detecting the threshold error in communication, the timer runs for the second timer duration.

12. The method of claim 1, further comprising:
  determining, respectively for each UE being served by the RN, a service level being provided to the UE, wherein setting the timer duration is further based on each determined service level.

13. The method of claim 1, further comprising:
  determining, respectively for each UE being served by the RN, an extent of communication between the RN and the UE, wherein setting the timer duration is further based on each determined extent of communication.

14. The method of claim 13, further comprising:
  determining, respectively for each UE being served by the RN, a service level being provided to the UE;
  based on the respectively determined service level, determining, respectively for each UE being served by the RN, a weight to be applied to the determined extent of communication between the RN and the UE; and
  determining, respectively for each UE being served by the RN, a weighted extent of communication by applying the determined weight to the determined extent of communication between the RN and the UE, wherein setting the timer duration based on each determined extent of communication comprises setting the timer duration based on each determined weighted extent of communication.

15. A wireless communication system comprising:
  a base station (BS);
  a relay node (RN) configured to be served by the BS over a relay backhaul air interface between the BS and the RN and configured to serve one or more user equipment devices (UEs) over a relay coverage air interface, wherein the RN is further configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface; and
  a controller configured to cause the wireless communication system to perform operations comprising:
    determining a count of how many UEs are being served by the RN over the relay coverage air interface;
    setting the timer duration of the timer based on the determined count of UEs; and
    in response to detecting the threshold error in communication on the relay backhaul interface, starting the timer to run for the timer duration set based on the determined count of UEs.

16. The wireless communication system of claim 15, wherein the controller is part of the BS and causes the BS to perform the operations.

17. The wireless communication system of claim 15, wherein the controller is part of the RN and causes the RN to perform the operations.

18. The wireless communication system of claim 15, further comprising data storage containing mapping data that maps (i) a first timer duration with a first count of UEs and (ii) a second timer duration with a second count of UEs,
  wherein the second count of UEs is higher than the first count of UEs,
  wherein the second timer duration is shorter than the first timer duration, and
  wherein setting the timer duration based on the determined count of UEs comprises referring to the mapping data and setting the timer duration in accordance with the mapping data.

19. A non-transitory computer readable medium having stored thereon instructions executable by a processor to cause a relay node (RN) to perform operations, the RN being configured to be served by a serving base station (BS) over a relay backhaul air interface between the BS and the RN and configured to serve one or more user equipment devices (UEs) over a relay coverage air interface, the operations comprising:
  determining a count of how many UEs are being served by the RN over the relay coverage air interface, wherein the RN is further configured (i) to detect when a threshold error in communication occurs on the relay backhaul air interface, (ii) in response to detecting the threshold error in communication, to start a timer that runs for a timer duration, and (iii) to respond to expiration of the timer duration by engaging in management of the relay backhaul air interface;

setting the timer duration of the timer based on the determined count of UEs; and in response to detecting the threshold error in communication on the relay backhaul interface, starting the timer to run for the timer duration set based on the determined count of UEs.

20. The non-transitory computer readable medium of claim 19, wherein the RN is further configured to refer to a data storage containing mapping data that maps (i) a first timer duration with a first count of UEs and (ii) a second timer duration with a second count of UEs, wherein the second count of UEs is higher than the first count of UEs, wherein the second timer duration is shorter than the first timer duration, and wherein setting the timer duration based on the determined count of UEs comprises referring to the mapping data and setting the timer duration in accordance with the mapping data.

\* \* \* \* \*